Jan. 3, 1956    F. H. SEITZ    2,729,470
RESILIENT DRAFT DEVICE WITH ADJUSTABLE ATTACHING MEANS
Filed March 8, 1952    3 Sheets-Sheet 1
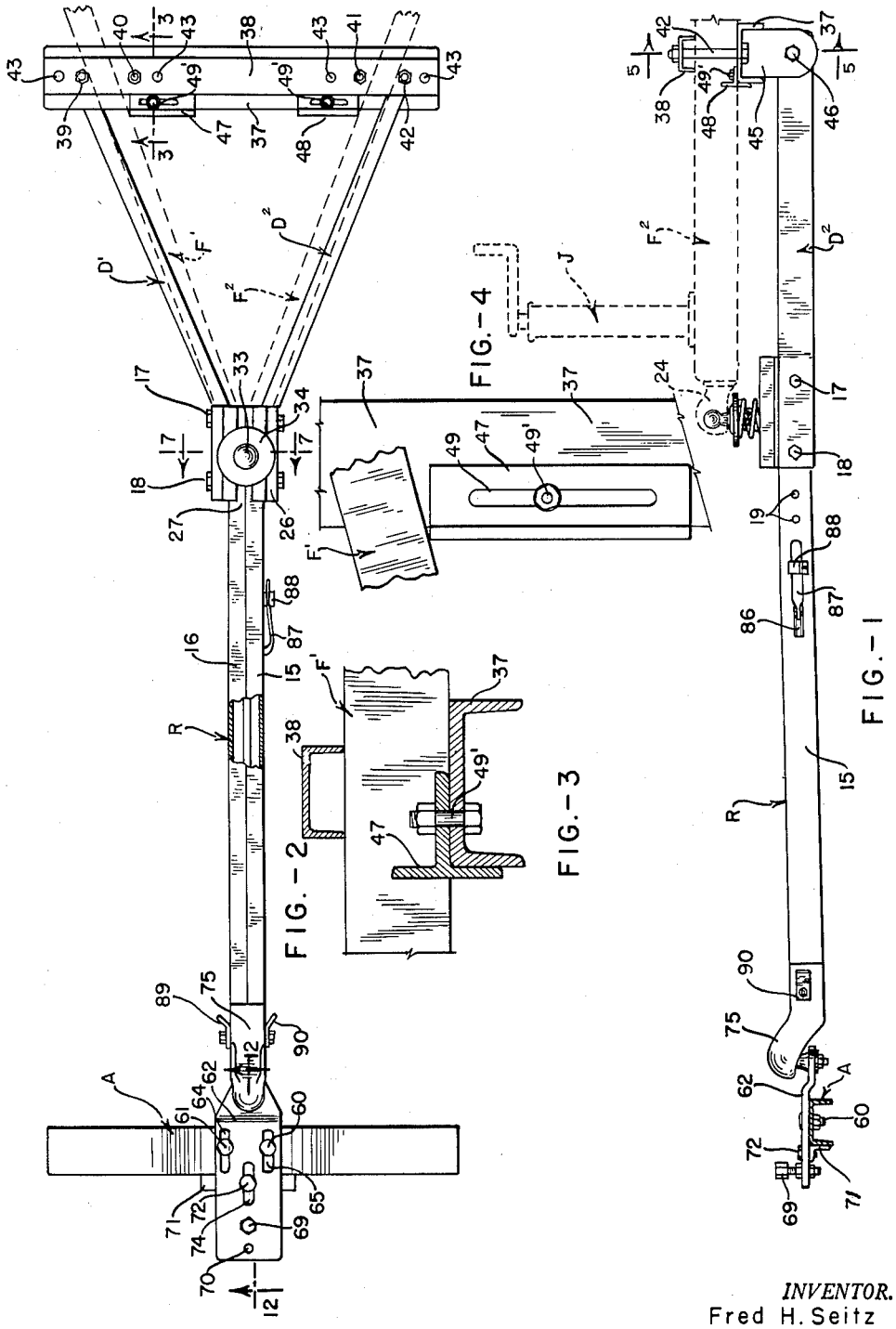
INVENTOR.
Fred H. Seitz
BY
Lamphere and Van Valkenburgh
ATTORNEYS Jan. 3, 1956 F. H. SEITZ 2,729,470
RESILIENT DRAFT DEVICE WITH ADJUSTABLE ATTACHING MEANS
Filed March 8, 1952 3 Sheets-Sheet 2

INVENTOR.
Fred H. Seitz
BY
Lanphere and Van Valkenburgh
ATTORNEYS

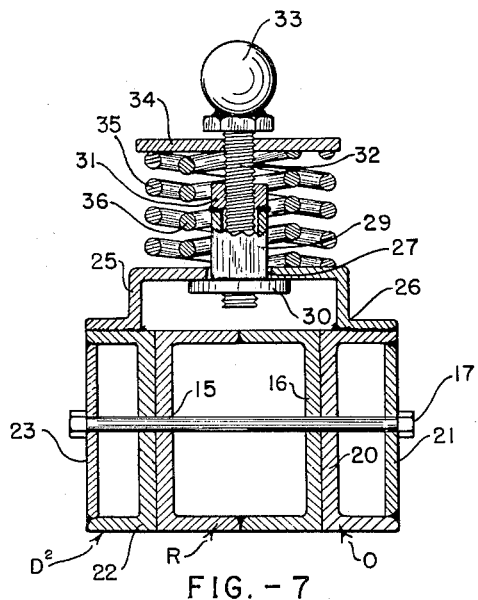
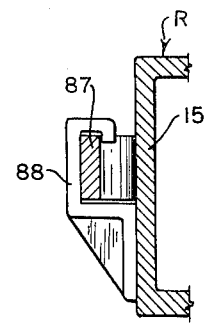
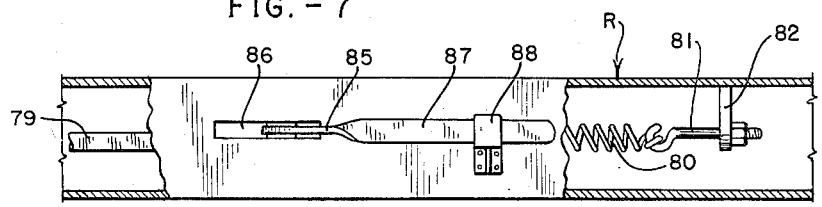
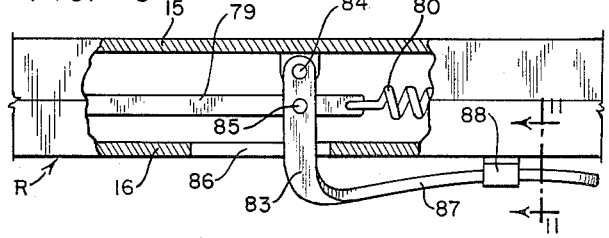
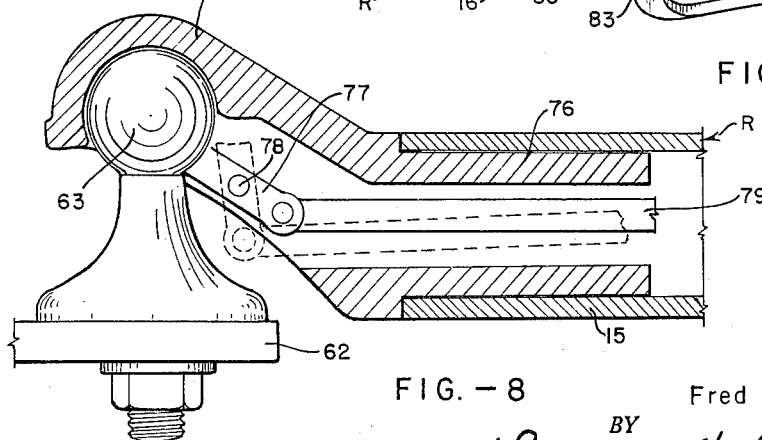
INVENTOR.
Fred H. Seitz

United States Patent Office 2,729,470
Patented Jan. 3, 1956

2,729,470

RESILIENT DRAFT DEVICE WITH ADJUSTABLE ATTACHING MEANS

Fred H. Seitz, Aurora, Colo.

Application March 8, 1952, Serial No. 275,494

5 Claims. (Cl. 280—483)

This invention relates to structure for connecting one vehicle to another for towing purposes, and more particularly to a so-called trailer hitch whereby a trailer vehicle can be connected to a towing vehicle such as an automobile.

One of the objects of my invention is to produce an improved hitch for towing a trailer which is constructed from a small number of rigid parts so arranged that they can be easily and quickly installed on both the trailer and towing automobile.

A further object is to produce a trailer hitch which will be connected in an improved and efficient manner to the towing vehicle at the rear axle thereof.

Yet another object of my invention is to produce a trailer hitch which will be so connected to the trailer vehicle that the towing will be accomplished in an easy manner without undue swaying, a tendency to jack-knife, or serious surging actions by the trailer.

A still further object is to produce a trailer hitch which will permit the towing vehicle to be driven with substantially the same ease and efficiency as it is without a trailer connected thereto.

Another object is to produce a trailer hitch having embodied therein in a simple manner yieldable means for preventing transmission of shocks to the towing vehicle, and also insuring a smoother trailing action by the trailer.

Still another important object is to construct a trailer hitch that can be easily and quickly adjusted for connecting various trailer frame structures to an automobile, all without the necessity of any alterations and reconstruction of the trailer frame, and also such a hitch that it can be placed in a compact form for shipping or transportation when not being used.

Yet another object is to produce a trailer hitch which will impose a smaller load on the towing vehicle thus saving tire wear and permitting larger trailers to be towed by the smaller automobiles.

Other objects of my invention will become apparent from the following description taken in connection with the accompanying drawings in which:

Figure 1 is a side view of my improved trailer hitch showing it associated with the axle of the towing vehicle and with the frame of a trailer, both of which are indicated by dashed lines;

Figure 2 is a top of the hitch;

Figure 3 is an enlarged sectional view taken on the line 3—3 of Figure 2;

Figure 4 is a top view of the structure shown in Figure 3;

Figure 7 is an enlarged sectional view taken on the line 7—7 of Figure 2 showing the ball connection of the hitch with the front end of the trailer frame and also details of the resilient structure and its adjustable parts;

Figure 8 is a partial sectional view showing the socket and ball connection between the reach and the hitch structure attached to the towing axle, together with the associated lock;

Figure 9 is a side view partly in section showing the hand operating means for locking and unlocking the reach of the hitch from the ball;

Figure 10 is a top view of the structure shown in Figure 9, parts being shown broken away;

Figure 11 is a sectional view taken on the line 11—11 of Figure 10;

Figure 15:
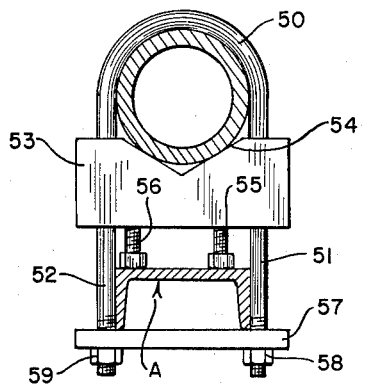
Figure 15 is a sectional view taken on the line 15—15 of Figure 13.

Referring to the drawings in detail and first to Figures 1 and 2, my improved trailer hitch as disclosed in a preferred embodiment comprises essentially a reach bar R, diverging draft bars $D^1$ and $D^2$ connected with the reach bar and adapted to be associated with the frame of the towed vehicle and additionally an axle bar A and suitable structure carried thereby to connect it to the axle of the towing vehicle and also to the reach bar.

I prefer to make my reach bar R from two channel members 15 and 16 having their flanges facing each other and welded together to thereby make a tubular bar of general square cross section, all as clearly shown in the cross-sectional view of Figure 7. The rear end of the reach bar has connected thereto the diverging draft bars $D^1$ and $D^2$, the connection being made by means of two bolts 17 and 18 which pass through the forward ends of both of the draft bars and the rear end of the reach bar with the draft bars being positioned on opposite sides of the reach bar, all as clearly illustrated. In order that there may be adjustment at the connection between the reach bar and the draft bars, the reach bar is provided with a plurality of suitably spaced holes 19 so at the forward ends the draft bars can be connected at the different points along the rear end of the reach bar. The draft bar $D^1$ is made from a channel 20 with the web part of the channel arranged to be placed alongside of the reach bar. This channel is closed by a suitable plate 21 which is welded to the flanges. In a like manner the draft bar $D^2$ is made from a channel 22 which is arranged to have its web portion engageable with the side of the reach bar. This channel is also closed by a plate 23 welded to the flanges thereof.

The two diverging draft bars are arranged to cooperate with and be attached to the forward end of a trailer frame and in Figures 1 and 2 a particular trailer frame is disclosed as having converging frame members $F^1$ and $F^2$, such members being in dashed lines. These converging frame members of the trailer extend forwardly beyond the front end of the trailer which is to be towed and as illustrated by dashed lines in Figure 1 such frame members carry a jack J whereby the forward end of the trailer can be held up level whenever it is disconnected from the towing vehicle. At the joined forward end of the two frame members there is provided a socket member 24. Normally this socket member is arranged to receive a ball member which is generally attached to the rear bumper on an automobile and constitutes the hitch for the trailer. However, it is such a hitch arrangement that the improved hitch embodying my invention is intended to eliminate. It is well-known that a trailer frame hitched directly by a ball and socket joint to an automobile rear bumper has many undesirable features and can even be said to be a dangerous type of hitch.

In my improved hitch I employ this socket member 24 to provide a resilient connection between the forward end of the trailer frame and the hitch at the juncture of the reach bar and the two diverging draw bars. This resilient connection is best illustrated in the detailed Figure 7. To the top of the forward end of the two draw bars there are welded Z-shaped plates 25 and 26. When the draw bars are attached to the reach bar the Z-shaped plates will be so spaced apart as to produce a slot 27. Within this slot is slidably mounted a sleeve 29 which is square so as to be held from turning. Since the sleeve is slidable longitudinally in the slot adjustment is available between the sleeve and the reach bar. The sleeve has welded to its lower end a flat plate 30 which lies below the Z-shaped plates so as to prevent upward movement of the sleeve in the slot. The upper end of the sleeve has welded thereto a nut 31, the threaded opening thereof being of smaller size than the diameter of the sleeve. The welded on nut has screwed therein a bolt 32 carrying at its upper end a ball 33. The bolt 32 is of considerable length and arranged to extend downwardly into the sleeve, all as illustrated, so that there can be considerable adjustment of the bolt relative to the sleeve. Also threaded on the bolt above the nut is a tensioning plate 34 of considerable diameter, and positioned between this tension plate and the top of the two Z-shaped plates 25 and 26 are two concentric springs 35 and 36 which constitute the resilient connection between the forward end of the trailer frame and my improved hitch. A single spring could be employed in place of the two springs but it has been found that a more desirable resilient action can be obtained by the two springs. The tensioning plate 34 which is adjustable on the bolt 32 can be screwed to various positions to either increase or decrease the compression of the springs and thereby change the resiliency between the forward end of the frame and the trailer hitch. It will be noted that whenever a downward force is placed upon the bolt 32 by the forward end of the trailer sufficient to compress the springs the sleeve 29 and the bolt are free to move downwardly relative to the plates 25 and 26 and the reach bar and thus absorb shocks which might otherwise be transmitted between the trailer frame and the hitch.

Figure 6:
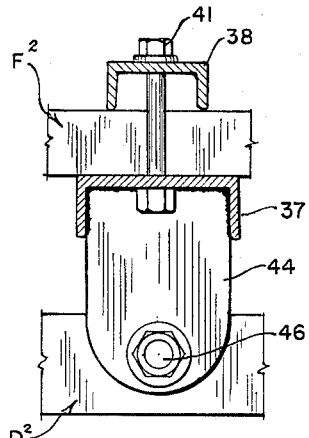
Figure 6 is a sectional view taken on the line 6—6 of Figure 5.
Figure 5:
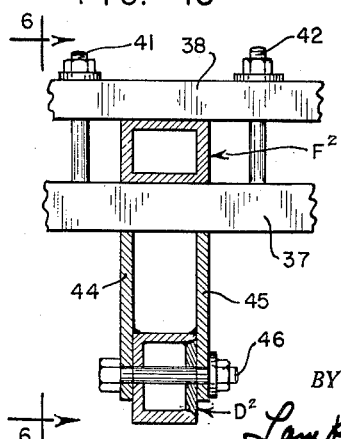
Figure 5 is a sectional view taken on the line 5—5 of Figure 1.

To connect the rear ends of the draw bars $D^1$ and $D^2$ to the trailer frame there is employed two channel members 37 and 38. Both of these channel members are of sufficient length to extend across the two frame members of the trailer. The channel member 38 is arranged to rest upon the tops of the two frame members $F^1$ and $F^2$ with the flanges extending downwardly. The other channel member 37 is positioned beneath the two frame members $F^1$ and $F^2$ and it is arranged to have its web engage the underneath surfaces of the two trailer frame members, all of which is illustrated in Figures 1, 5 and 6. To clamp the two channel members 37 and 38 to the trailer frame members, bolts 39, 40, 41 and 42 are employed, it being noted from Figure 2 that the arrangement of the bolts is such that there will be a bolt on each side of a frame member. In order to provide adjustment so that a good fit can be made on different sizes of trailer frames, extra holes, such as those indicated at 43, are provided in the two channel members 37 and 38. The bolts can be shifted as desired in order to place them adjacent the frame members and thereby insure good clamping action.

To connect the rear ends of the two draw bars to the lower channel member 37 this channel member has welded thereto hanger members 44 and 45 for each draw bar. Figures 5 and 6 disclose the hanger arrangement for the draw bar $D^2$, and since the other hanger construction for the draw bar $D^1$ is identical it will not be necessary to describe it in detail. The two hanger members 44 and 45 for a draw bar are plates arranged in spaced relation to project downwardly from the channel member 37. The rear end of the draw bar is, as shown in Figures 5 and 6, arranged to extend between the lower ends of these two hangers and to be pivotally connected thereto by means of a bolt 46.

In order to further aid in preventing lateral shifting of the cross channel members 37 and 38 clamped to the frame members $F^1$ and $F^2$ by means of the various bolts, there is provided abutment members 47 and 48 which are adjustably carried by the lower channel member 37. The abutment member 47 is shown in detail in Figures 3 and 4. Each abutment comprises a member of T-shaped cross section, the stem of which rests on top of the channel member 37 and is provided with a slot 49 for receiving a clamping bolt 49' extending through a hole in the channel member. The lower flange part of the abutment member engages the side of the forward flange of the channel member, this making a solid mounting. With the abutment members 47 and 48 constructed and mounted as shown it is seen that they can be slid to positions to abut against the inner sides of the two frame members $F^1$ and $F^2$ and then clamped in these positions by the bolts 49'. Thus, even if the clamping bolts for the two cross channel members 37 and 38 should not be drawn tight enough to prevent shifting of these channel members relative to the frame members of the trailer, because of extreme forces present during the towing of the trailer, the abutment members 47 and 48 nevertheless will be available to aid in preventing the lateral shifting.

Figure 14:
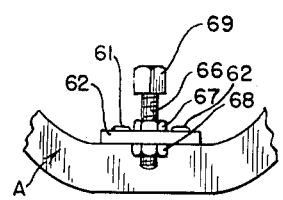
Figure 14 is a front view of a part of the axle bar structure showing the adjustable abutment between the bar and propeller shaft.

With my improved hitch the forward end of the reach bar is connected to the axle housing of the towing vehicle and this is accomplished by the already referred to axle bar A and associated structure, all of which is illustrated in detail in Figures 1, 2, 12, 13, 14 and 15. This axle bar is of channel shaped cross section and bowed downwardly in its middle so as to properly fit in with the differential housing at the center of the axle housing. The outer ends of the axle bar have similar connections with the axle housing and therefore only one connection will be described in detail, which connection is best illustrated in Figure 14. Extending over the top of the axle housing is a U-shaped clamping bolt 50 provided with threaded legs 51 and 52 of considerable length. The bolt is held adjacent the axle by a cross piece 53 which will have a notch 54 to be clamped up against the lower side of the axle housing by stud bolts 55 and 56 carried by cross piece 53 and arranged to abut the axle bar. A plate 57 is positioned below the axle bar on the ends of the U bolt and by means of nuts 58 and 59 this plate is drawn up against the axle bar and the axle bar against the heads of the studs. The studs permit any adjustment desired.

Figure 12:
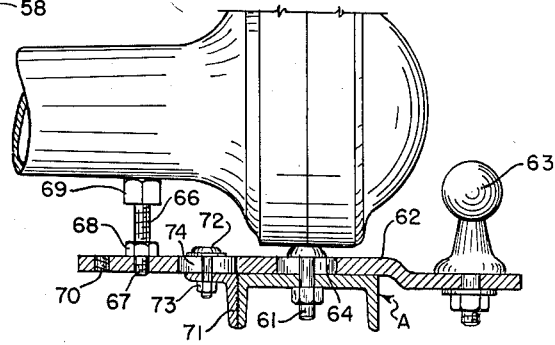
Figure 12 is an enlarged sectional view taken on the line 12—12 of Figure 2, showing the axle bar structure and the manner of mounting thereon the ball for the reach bar, said view also showing the relationship of the structure with the differential housing.
Figure 13:
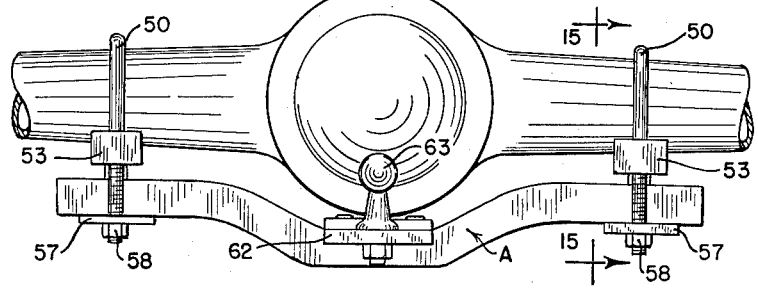
Figure 13 is a rear view of the axle bar structure showing it attached to the axle housing.

At the center of the axle bar there is mounted thereon, by means of bolts 60 and 61, a cross plate 62, the rear end of which extends outwardly beyond the axle bar and carries a ball 63 clamped thereto by a nut. In order to permit adjustment crosswise of the axle bar, the plate is provided with slots 64 and 65 through which the bolts 60 and 61 extend. At the forward end of the plate 62 there is mounted thereon an adjustable stud bolt 66 threaded into a hole 67 and locked by a nut 68. The upper end of the stud 66 is provided with a head 69 which abuts against the differential housing, as illustrated in Figure 12. With this adjustable stud, the forward end of the plate will be prevented from being shifted upwardly by any forces acting downwardly at the rear end of the plate as a result of connecting the reach bar of the trailer to the ball 63. To permit adjustment of the stud to fit different automobiles a second threaded hole 70 is in the plate. To aid in preventing lateral shifting of the plate 62 by any forces which might occur, the axle bar A on its forward side has welded thereto an angle iron 71 and a bolt 72 and nut 73 holds the plate 62 to the angle iron. It will also be noted from Figure 12 that the bolt 72 extends through a longitudinal slot 74 in plate 62 so the plate can be adjusted. In mounting the plate on the axle bar the various bolts 60, 61 and 72 can be suitably adjusted in the slots to make the plate and ball 63 fit properly with the differential housing. The stud 66 can be adjusted relative to the plate so that its head can properly engage the differential housing or the propeller shaft housing.

At the forward end of the reach bar there is provided a socket member 75 having a rearwardly extending square hollow portion for telescopic positioning in the forward end of the reach bar. This telescopic end portion 76 will be welded into the forward end of the reach bar so the socket member will be rigidly attached to the bar. The socket member is adapted to fit over the ball 63 carried by the rear end of the cross plate mounted on the axle bar. With this ball and socket connection, the towing vehicle is free to have universal connection with the reach bar of the hitch, thus permitting the free turning of the towing vehicle and also any up and down movement as it moves over the highway.

To provide for locking of the socket member on the ball 63 in a quick and efficient manner, I provide a pivoted locking lever 77 carried by the socket member on the inside thereof. The locking lever is pivoted by a pin 78 adjacent its center and the place of pivoting is such that the upper end of the lever can be swung to a locking position beneath the lower surface of the ball, as shown in full lines in Figure 8, or to an unlocked position wherein the socket member can be lifted off the ball, all as shown in dashed lines in Figure 8. To permit easy operation of the locking lever without getting beneath the towing automobile, the rear end of the locking lever has connected thereto a rod 79 which extends rearwardly through the hollow reach bar and has fastened to its rear end a pull spring 80 connected by an eye bolt 81 to a lug 82 carried inside the reach bar. The spring normally pulls the rod rearwardly so as to place the locking lever in locked position.

To unlock the locking lever, there is provided a hand operated lever 83 which has its inner end pivoted to the inside of the reach bar by a pin 84. The lever is also pivoted by a pin 85 to the actuating rod 79. The lever extends through a slot 86 in the side of the reach bar and has a curved end portion 87 which is arranged to lie alongside the reach bar and to fit into a suitable holding clip 88 carried on the outer side of the bar. When the hand lever is placed inside the holding clip, the rod will be held in its rearward locking position by the hand lever. The locking action is also aided by the pull spring 80. Whenever it should be desired to unlock the socket member from the ball, the handle 87 of the hand lever can be moved out of the holding clip 88 by first an inward movement and then an upward movement, as is apparent from Figure 11. When the handle is free of the clip, it can be pulled outwardly away from the reach bar and this will result in the rod 79 being moved forwardly so as to move the locking lever to its unlocking position.

If safety chains are desired the forward end of the reach bar has screwed thereto eye brackets 89 and 90 into which they can be hooked.

With my improved trailer hitch described in detail it is believed to be apparent that it is simple in construction and easy to install. No parts of the hitch need be built onto the automobile in a permanent manner so as to detract from its appearance. All the parts of the axle bar can be easily removed at any time. The entire hitch can be installed in a short period of fifteen or twenty minutes by one person using only a wrench. All parts when installed are rigidly attached. Adjustments are provided at different places so that a good fit can be obtained regardless of the type or size of the trailer frame or the size and kind of axle housing and differential housing on the towing automobile. The trailer frame can be properly adjusted to the hitch to have the right height. This is done by adjusting the bolt 32 in the sleeve 39 to vary the height of ball 33. The tension of the shock springs can be varied as desired in an easy manner by means of tension plate 34. Tests show the hitch materially decreases the load on the towing automobile. Thus, there will be less wear on the rear tires of said vehicle. Larger trailers can thus be pulled by smaller automobiles. The hitch insures easy towing of the trailer with no noticeable effect on the driving of the towing automobile. The lock at the ball 63 is positive yet easily released. It will be noted that the greater the tendency of the socket to move off the ball the greater will become the locking action as the locking lever is pressed down onto the stud below the ball. Since no parts are longer than the reach bar it is seen that the hitch can occupy a small space for shipping or transporting when it is "knocked down."

It is believed to be obvious that modifications can be made in the structure shown by way of example, all without departing from the fundamental principles of the invention, and therefore it is to be understood that the scope of the invention is not to be limited except in accordance with the appended claims.

What is claimed is:

1. A hitch structure for connecting a trailer vehicle having a forwardly extending frame structure to a towing vehicle comprising, a reach bar for connecting to the towing vehicle, detachable means for pivotally connecting the rear end of the reach bar to the under side of the trailer frame structure rearwardly of its forward end, means for yieldably connecting the reach bar to the forward end of the frame structure, and means embodied in the yieldable connecting means and including a structure establishing a longitudinal slot above the reach bar and a member connected to the trailer frame and slidable in the slot for permitting the reach bar to be freely slidable longitudinally relative to the forward end of the frame and thereby allowing the detachable connection between the trailer frame structure and rear end of the reach bar to be easily made at points having different distances from the forward end of the trailer frame structure.

2. A hitch structure for connecting a trailer vehicle having a forwardly extending frame structure provided with a socket to a towing vehicle comprising, a reach bar for positioning beneath the trailer frame structure, detachable means for pivotally connecting the rear end of the reach bar to the trailer frame structure rearwardly of its forward end, means for yieldably connecting the reach bar to the forward end of the frame structure including a bolt carried by the reach bar and being provided with a ball on its upper end to receive the socket of the trailer frame structure and a spring surrounding the bolt and acting between the reach bar and the trailer frame structure, and means for mounting the bolt for longitudinal sliding movement on the reach bar for permitting the longitudinal adjustment of the reach bar relative to the trailer frame structure so that connection with the trailer frame can be easily made at points having different distances from the forward end of the trailer frame structure.

3. In a hitch structure for connecting a trailer vehicle having a frame structure provided with forwardly converging members to a towing vehicle comprising, a reach bar of considerable length for connecting to the towing vehicle, diverging draft bars connected to and extending from the rear end of the reach bar, a cross member of a length to extend between the converging members of the trailer frame structure a substantial distance rearwardly of their forward ends, means for detachably connecting the cross member to both frame members, means for pivotally connecting the rear ends of the draft bars to and below the opposite ends of the cross member, abutments carried by the cross member for engaging the sides of the trailer frame members to thereby restrain longitudinal shifting of the cross member relative to the frame members, means for adjusting the abutments at will on the cross member, means for yieldably connecting the forward ends of the converging members of the trailer frame structure to and above the reach bar at the juncture of the draft bars, said last named means including a ball and socket connecting means and an associated coiled spring interposed directly between the forward ends of the converging members and the ball and socket means, and means associated with the ball and socket connecting means for varying the tension of the coiled spring.

4. A hitch structure for connecting a trailer vehicle having spaced frame members to a towing vehicle, comprising a reach bar, a cross member for extending between the spaced frame members of the trailer, means for detachably clamping the cross member to the frame members at points spaced from the forward end thereof and means for yieldably and slidably connecting the forward end of the frame members to the reach bar, means for pivotally connecting the reach bar to the cross member, abutments carried by the cross member for engaging the sides of the trailer frame members and thereby restrain longitudinal shifting of the cross member relative to the frame members, means for adjusting the abutments at will on the cross member, and means for connecting the forward end of the reach bar to the towing vehicle.

5. A hitch structure for connecting a trailer vehicle having a forwardly extending frame structure to a towing vehicle comprising, a reach bar for positioning beneath the trailer frame structure and for connecting to the towing vehicle, detachable means for pivotally connecting the reach bar to the trailer frame structure rearwardly of its forward end, means for yieldably connecting the reach bar to the frame structure adjacent the forward end thereof, and means embodied in the yieldable connecting means and including a structure establishing a longitudinal slot above the reach bar and a member connected to the trailer frame and slidable in the slot for permitting the reach bar to be freely slidable longitudinally relative to the forward end of the frame and thereby allowing the detachable connection between the trailer frame structure and the reach bar to be easily made at points having different distances from the forward end of the trailer frame structure.

References Cited in the file of this patent
UNITED STATES PATENTS

| | | |
|---|---|---|
| 2,237,166 | Schoenrock | Apr. 1, 1941 |
| 2,255,624 | Luse | Sept. 9, 1941 |
| 2,453,941 | Smit | Nov. 16, 1948 |
| 2,459,965 | Robertson | Jan. 25, 1949 |
| 2,486,605 | Ladd | Nov. 1, 1949 |
| 2,517,047 | Spitler | Aug. 1, 1950 |
| 2,523,211 | Hedgepeth | Sept. 19, 1950 |
| 2,531,289 | Murat | Nov. 21, 1950 |
| 2,622,891 | Knapp | Dec. 23, 1952 |
| 2,634,986 | McDaniel | Apr. 14, 1953 |
| 2,643,891 | Mosley | June 30, 1953 |